(12) United States Patent
Baek et al.

(10) Patent No.: US 11,631,937 B2
(45) Date of Patent: Apr. 18, 2023

(54) COMBO ANTENNA MODULE

(71) Applicant: AMOTECH CO., LTD., Incheon (KR)

(72) Inventors: Hyungil Baek, Yongin-si (KR); Jinwon Noh, Gwangju (KR); Kisang Lim, Incheon (KR); Seonghyun Kim, Gwacheon-si (KR); Chungha Back, Yeongcheon-si (KR); Donghyun Im, Bucheon-si (KR)

(73) Assignee: AMOTECH CO., LTD., Incheon (KR)

( * ) Notice: Subject to any disclaimer, the term of this patent is extended or adjusted under 35 U.S.C. 154(b) by 183 days.

(21) Appl. No.: 17/273,881

(22) PCT Filed: Sep. 6, 2019

(86) PCT No.: PCT/KR2019/011589
§ 371 (c)(1),
(2) Date: Mar. 5, 2021

(87) PCT Pub. No.: WO2020/050698
PCT Pub. Date: Mar. 12, 2020

(65) Prior Publication Data
US 2021/0336341 A1    Oct. 28, 2021

(30) Foreign Application Priority Data
Sep. 7, 2018 (KR) .......... 10-2018-0107043

(51) Int. Cl.
*H01Q 7/00* (2006.01)
*H01Q 1/22* (2006.01)

(52) U.S. Cl.
CPC ............ *H01Q 7/00* (2013.01); *H01Q 1/2208* (2013.01)

(58) Field of Classification Search
CPC .......... H01Q 1/2208; H01Q 7/00; H01Q 1/38; H01Q 7/04; H02J 50/005; H02J 50/23
See application file for complete search history.

(56) References Cited

U.S. PATENT DOCUMENTS 10,547,111 B2    1/2020  Orihara
10,891,529 B2 *  1/2021  Yazaki ................. H01Q 9/00
(Continued)

FOREIGN PATENT DOCUMENTS

JP    2013-146050 A    7/2013
JP    2016-225675 A    12/2016
(Continued)

OTHER PUBLICATIONS

International Search Report dated Jan. 31, 2020 as received in Application No. PCT/KR2019/011589.
(Continued)

*Primary Examiner* — Thien M Le
(74) *Attorney, Agent, or Firm* — Maschoff Brennan

(57) ABSTRACT

Disclosed is a combo antenna module which can improve antenna performance by arranging a radiation pattern for electronic payment such that a portion of the radiation pattern does not overlap a magnetic sheet. The disclosed combo antenna module includes: a radiation pattern for wireless power transmission and a radiation pattern for electronic payment which are formed on a base substrate; and a magnetic sheet arranged to overlap the entire radiation pattern for wireless power transmission and a portion of the radiation pattern for electronic payment.

15 Claims, 9 Drawing Sheets

(56) References Cited

U.S. PATENT DOCUMENTS

| | | | |
|---|---|---|---|
| 11,087,912 B2* | 8/2021 | Jang | H02J 50/70 |
| 11,126,995 B2* | 9/2021 | Gandolfo | G06Q 20/341 |
| 11,270,181 B2* | 3/2022 | Lee | H02J 50/20 |
| 2015/0116090 A1* | 4/2015 | Proehl | H01F 27/366 |
| | | | 307/104 |
| 2017/0117630 A1* | 4/2017 | Lilja | H04B 5/0031 |
| 2019/0074577 A1 | 3/2019 | Kim et al. | |
| 2019/0097447 A1* | 3/2019 | Partovi | H02J 50/12 |
| 2019/0260118 A1* | 8/2019 | Moon | H01Q 7/00 |
| 2020/0251929 A1* | 8/2020 | Partovi | H01F 27/366 |
| 2021/0049439 A1* | 2/2021 | Finn | G06K 19/07354 |

FOREIGN PATENT DOCUMENTS

| | | | |
|---|---|---|---|
| KR | 10-2014-0102617 A | 8/2014 |
| KR | 10-2016-0129927 A | 11/2016 |
| KR | 10-2017-0053142 A | 5/2017 |
| KR | 10-2017-0093738 A | 8/2017 |
| KR | 10-1872399 B1 | 6/2018 |

OTHER PUBLICATIONS

KR Office Action dated Jul. 6, 2020 as received in Application No. 10-2019-0110834.
KR Decision to Grant dated Dec. 14, 2020 as received in Application No. 10-2019-0110834.

\* cited by examiner

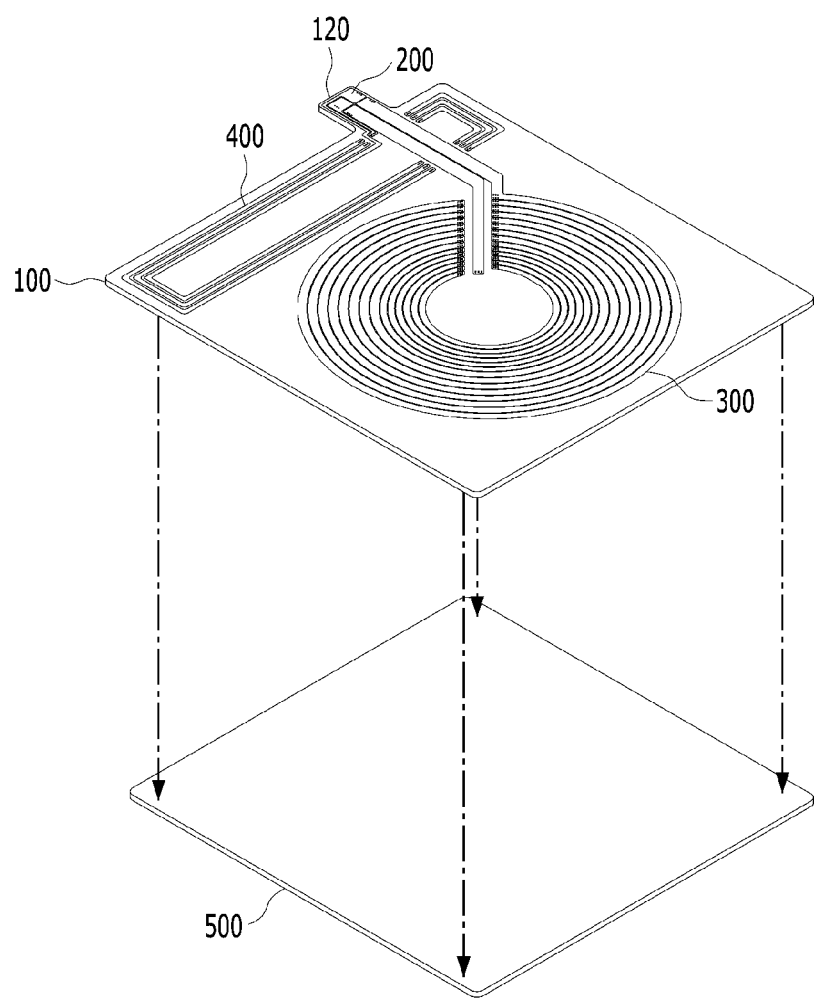
[FIG. 1]

[FIG. 2]
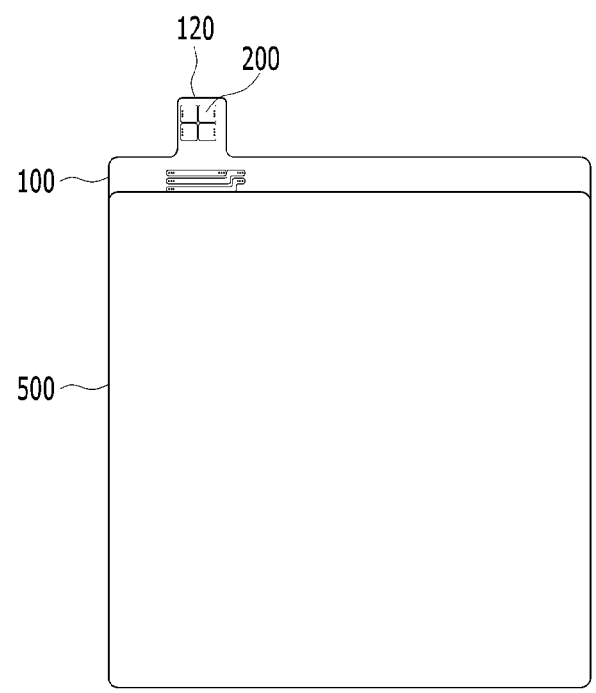

[FIG. 3]
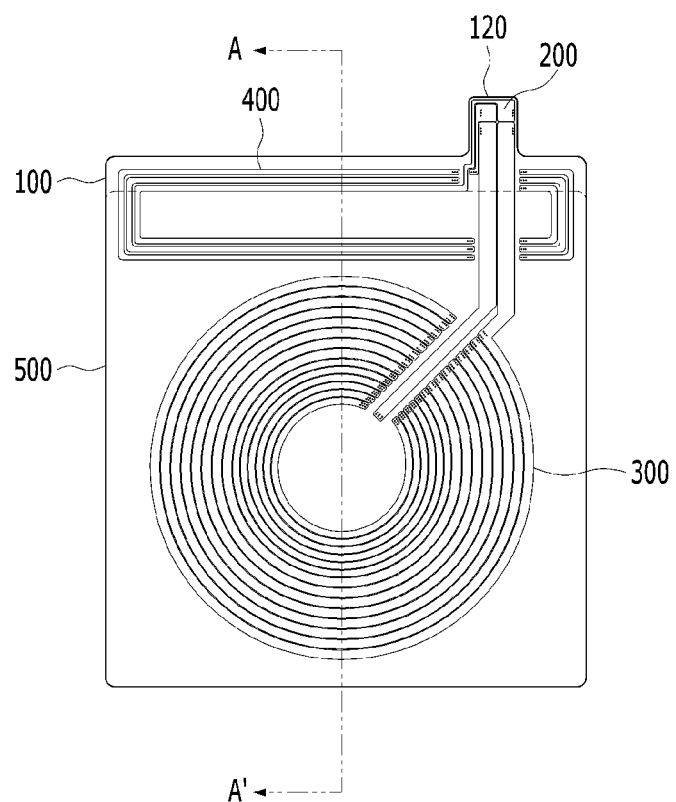
[FIG. 4]
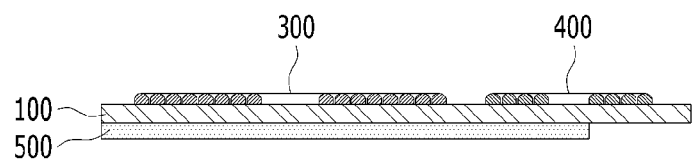

[FIG. 5]
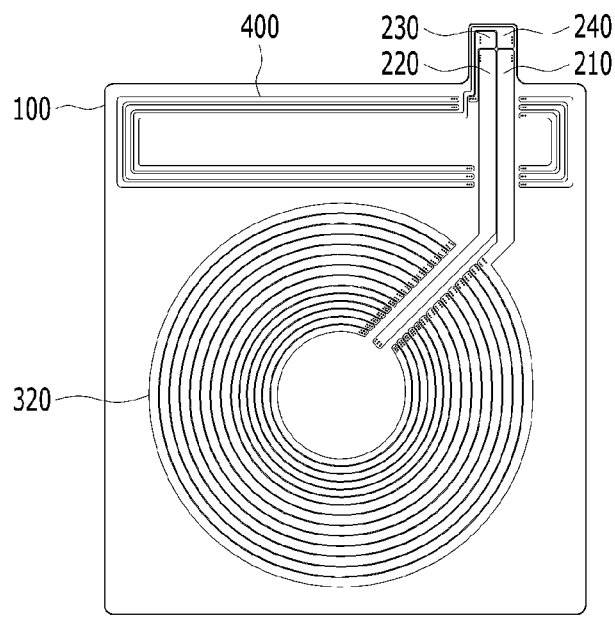
[FIG. 6]
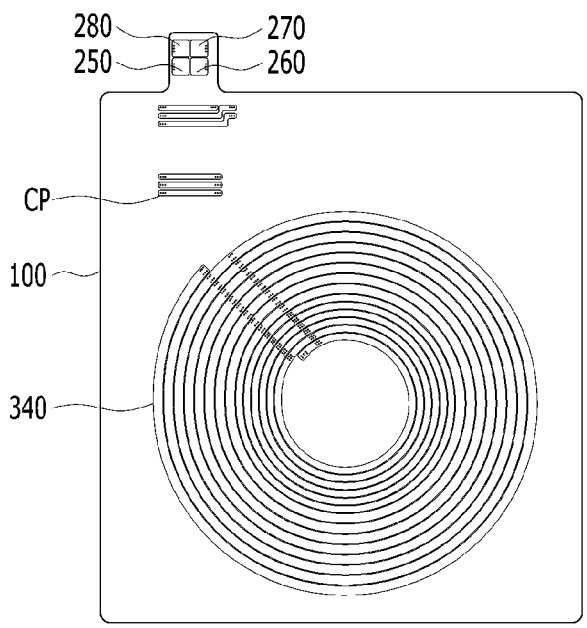

[FIG. 7]
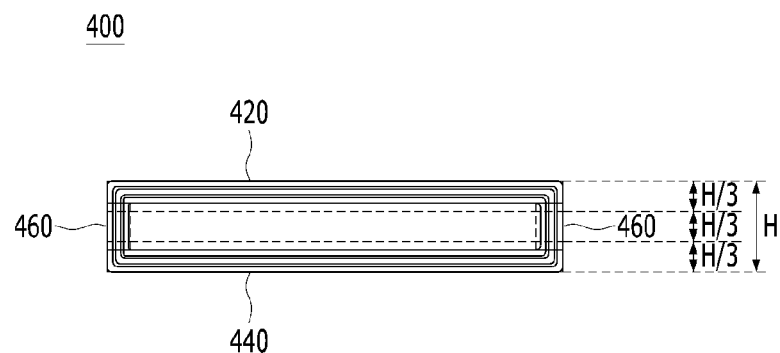
[FIG. 8]
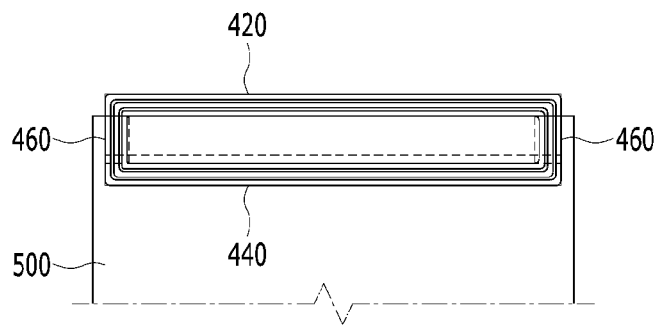
[FIG. 9]
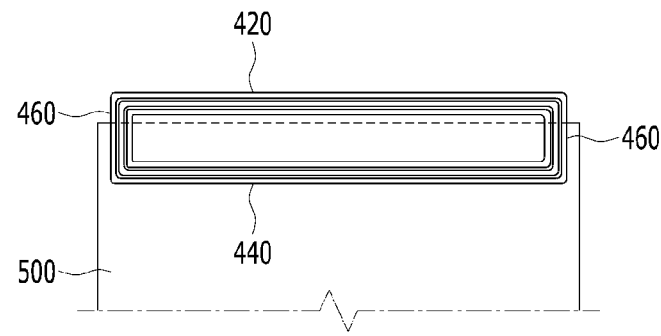

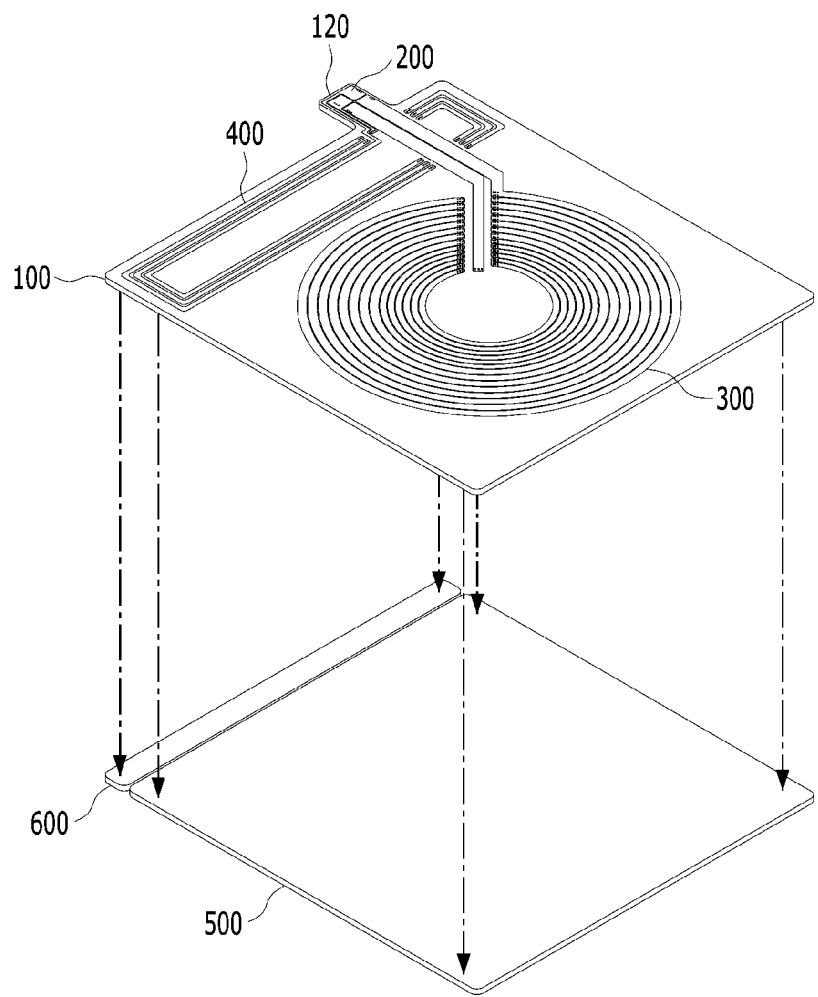
[FIG. 10]

[FIG. 11]
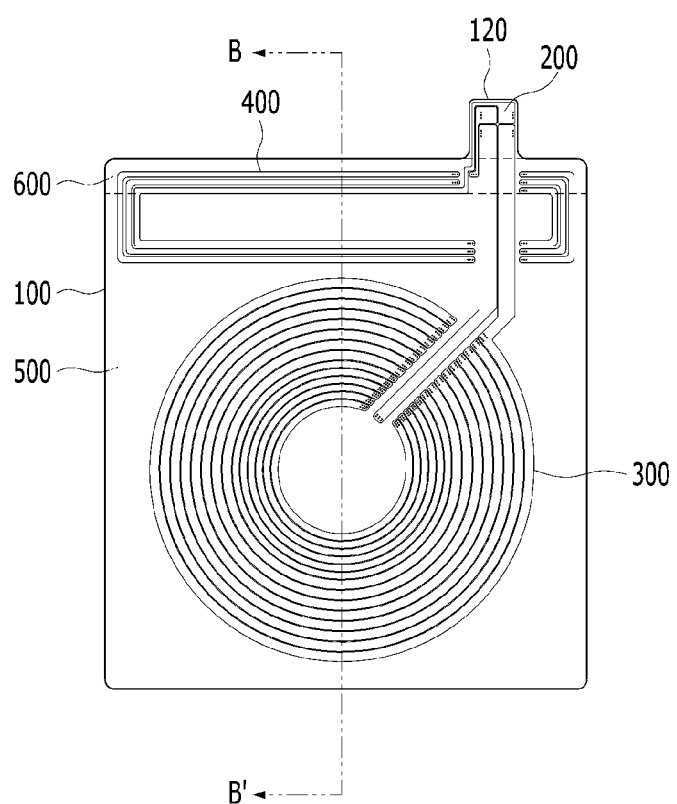

[FIG. 12]
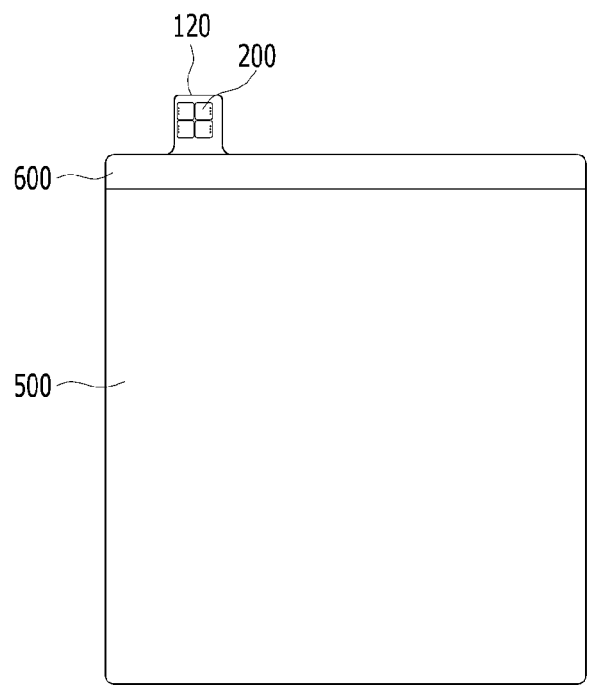
[FIG. 13]
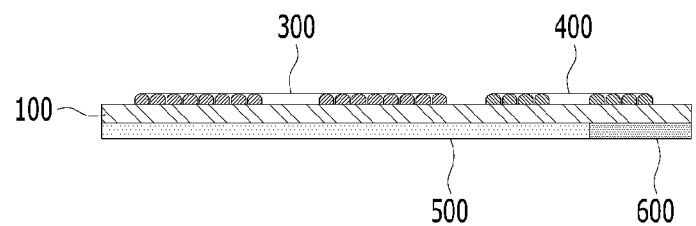

[FIG. 14]
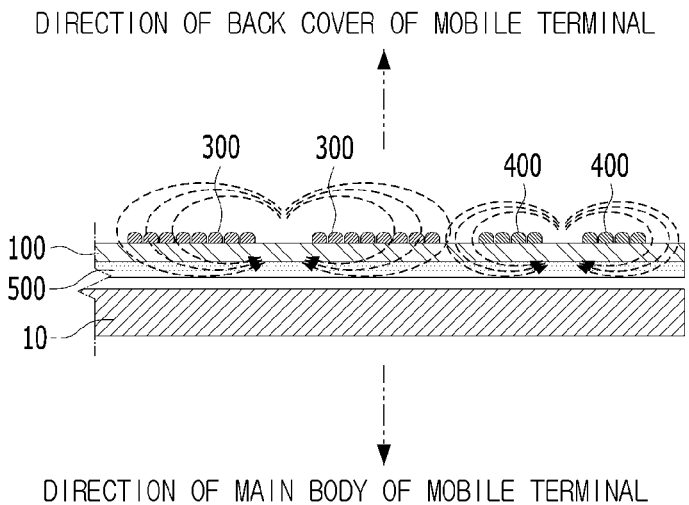
[FIG. 15]
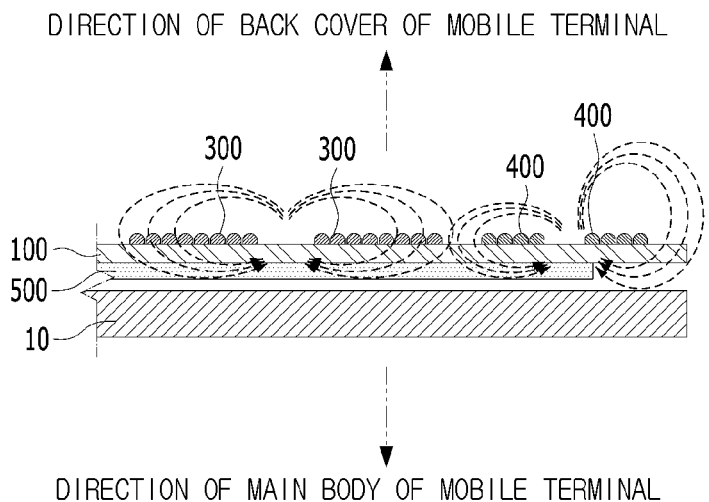
[FIG. 16]
| SHIELDING STRUCTURE OF MAGNETIC SHEET | STRENGTH OF MAGNETIC FIELD FOR ELECTRONIC PAYMENT | |
|---|---|---|
| | Z-Y @ X=0 (135 SCORES OR MORE) | X-Y @ Z=2 (55% OR MORE) |
| COMMON SHIELDING STRUCTURE | 153 | 62.75% |
| SHIELDING STRUCTURE OF EMBODIMENT OF PRESENT DISCLOSURE | 161 | 67.32% |

COMBO ANTENNA MODULE

TECHNICAL FIELD

The present disclosure relates to a combo antenna module, and more particularly, to a combo antenna module which is mounted on a mobile terminal and transmits signals for wireless power and electronic payment.

BACKGROUND ART

With the development of a technology, multiple antennas are mounted on a mobile terminal. The antennas mounted on the mobile terminal include an antenna for mobile communication, an antenna for short distance communication, an antenna for wireless power transmission, an antenna for electronic payment, etc.

If a plurality of antennas is mounted on the mobile terminal, many mounting spaces are necessary. Recently, a combo antenna module in which an antenna for short distance communication, an antenna for wireless power transmission, an antenna for electronic payment, etc. are integrated into a single module is applied to a mobile terminal.

In a common combo antenna module, a magnetic sheet is disposed on the entire back surface of a substrate in which a plurality of antennas is formed in order to maximize antenna performance.

In a recent combo antenna module, however, in order to reduce a mounting space and unit cost for a mobile terminal, an area where a radiation pattern for electronic payment is formed is minimized. Accordingly, if a magnetic sheet is disposed on the entire substrate as in a common combo antenna module, there is a problem in that antenna performance of the radiation pattern for electronic payment is degraded.

DISCLOSURE

Technical Problem

The present disclosure is proposed to solve the above conventional problems, and an object of the present disclosure is to provide a combo antenna module in which a portion of a radiation pattern for electronic payment is disposed not to overlap a magnetic sheet, thereby improving antenna performance.

Technical Solution

In order to achieve the above object, a combo antenna module according to an embodiment of the present disclosure includes a base substrate, a radiation pattern for wireless power transmission formed on the base substrate, a radiation pattern for electronic payment formed on a top surface of the base substrate, and a magnetic sheet disposed on a bottom surface of the base substrate, wherein a portion of the radiation pattern for electronic payment is disposed on an area where the base substrate and the magnetic sheet do not overlap.

The base substrate may include an overlap area overlapping the magnetic sheet and a non-overlap area not overlapping the magnetic sheet. In this case, the radiation pattern for wireless power transmission is disposed on only the overlap area, and the radiation pattern for electronic payment is disposed on the overlap area and the non-overlap area.

A first area of the radiation pattern for electronic payment, which is adjacent to the base substrate, may not overlap the magnetic sheet. A second area of the radiation pattern for electronic payment, which is adjacent to the radiation pattern for wireless power transmission, may overlap the magnetic sheet.

The radiation pattern for electronic payment may be disposed between an outer circumference of the base substrate and the radiation pattern for wireless power transmission. Some area of the radiation pattern for electronic payment, which is adjacent to the outer circumference of the base substrate, may not overlap the magnetic sheet, and the remaining area of the radiation pattern for electronic payment, which is adjacent to the radiation pattern for wireless power transmission, may overlap the magnetic sheet.

The radiation pattern for electronic payment may include an upper pattern disposed adjacent to an outer circumference of the base substrate, a lower pattern disposed adjacent to the radiation pattern for electronic payment and overlapping the magnetic sheet, and a side pattern connecting the upper pattern and the lower pattern. In this case, the upper pattern may not overlap the magnetic sheet. The side pattern may overlap the magnetic sheet, or some area adjacent to the lower pattern in the entire area of the side pattern may overlap the magnetic sheet. The magnetic sheet may overlap the radiation pattern for wireless power transmission.

The combo antenna module according to an embodiment of the present disclosure may further include a step compensation sheet disposed on the bottom surface of the base substrate and disposed on an area where the magnetic sheet is not disposed. In this case, the step compensation sheet may overlap a portion of the radiation pattern for electronic payment, which does not overlap the magnetic sheet.

Advantageous Effects

According to the present disclosure, the combo antenna module has an effect in that it can improve the range and strength of a magnetic field by the radiation pattern for electronic payment because a portion of the radiation pattern for electronic payment is disposed not to overlap the magnetic sheet.

Furthermore, the combo antenna module has an effect in that it can improve a recognition range and distance of the radiation pattern for electronic payment because a portion of the radiation pattern for electronic payment is disposed not to overlap the magnetic sheet.

Furthermore, the combo antenna module has an effect in that it can provide antenna performance having a level equivalent to that of a radiation pattern for electronic payment having the existing size although the size of the radiation pattern for electronic payment is reduced in a mobile terminal whose mounting space is not sufficient because a portion of the radiation pattern for electronic payment is disposed not to overlap the magnetic sheet.

DESCRIPTION OF DRAWINGS

FIGS. 1 to 4 are diagrams for describing a combo antenna module according to an embodiment of the present disclosure.

FIGS. 5 and 6 are diagrams for describing a radiation pattern for wireless power transmission and a radiation pattern for electronic payment in FIG. 1.

FIG. 7 is a diagram for describing the radiation pattern for electronic payment in FIG. 1.

FIGS. 8 and 9 are diagrams for describing a magnetic sheet of FIG. 1.

FIGS. 10 to 13 are diagrams for describing a modified example of the combo antenna module according to an embodiment of the present disclosure.

FIGS. 14 to 16 are diagrams for describing a comparison between the combo antenna module according to an embodiment of the present disclosure and a conventional combo antenna module.

MODE FOR INVENTION

Hereinafter, the most preferred exemplary embodiments of the present disclosure will be described with reference to the accompanying drawings in order to specifically describe the exemplary embodiments so that those skilled in the art to which the present disclosure pertains may easily implement the technical spirit of the present disclosure. First, in adding reference numerals to the components of each drawing, it should be noted that the same components have the same reference numerals as much as possible even if they are displayed in different drawings. Further, in describing the present disclosure, when it is determined that the detailed description of the related well-known configuration or function may obscure the gist of the present disclosure, the detailed description thereof will be omitted.

Referring to FIGS. 1 to 4, a combo antenna module according to an embodiment of the present disclosure is configured to include a base substrate 100, a terminal pattern 200, a radiation pattern 300 for wireless power transmission, a radiation pattern 400 for electronic payment and a magnetic sheet 500.

The base substrate 100 is formed of a thin film sheet-shaped material. The base substrate 100 is formed of a sheet-shaped material having a top surface, a bottom surface and a side. In this case, the top surface of the base substrate 100 is illustrated as being a surface on which an antenna module is mounted and that faces the cover of a back surface of a mobile terminal. The bottom surface of the base substrate 100 is illustrated as being a surface on which a combo antenna module is mounted and that faces a PCB, a battery, other metal members, etc. embedded in the mobile terminal.

The base substrate 100 is formed of a thin film flexible material, such as a film, a sheet, or a thin film substrate, and is illustrated as being a polypropylene (PP) sheet. The base substrate 100 may be a flexible printed circuit board (FPCB). The base substrate 100 is not limited thereto, and a material which is a thin film material and may form a metal pattern or a coil pattern constituting an antenna may be variously used.

A protruding part 120 is formed in the base substrate 100. The protruding part 120 is formed to extend from the side of the base substrate 100 to an external direction. In this case, the protruding part 120 is an area where a plurality of terminal patterns 200 is formed.

The terminal pattern 200 is configured in plural number, and is formed in the protruding part 120 of the base substrate 100. The terminal pattern 200 is illustrated as being a terminal for connecting the radiation pattern 300 for wireless power transmission and the radiation pattern 400 for electronic payment to an internal circuit of a mobile terminal on which a combo antenna module is mounted.

Referring to FIGS. 5 and 6, the terminal pattern 200 includes a first terminal pattern 210, a second terminal pattern 220, a third terminal pattern 230 and a fourth terminal pattern 240.

The first terminal pattern 210 is formed on the top surface of the base substrate 100 in the protruding part 120, and is electrically connected to a first end portion of the radiation pattern 300 for wireless power transmission.

The second terminal pattern 220 is formed on the top surface of the base substrate 100 in the protruding part 120, and is electrically connected to a second end portion of the radiation pattern 300 for wireless power transmission.

The third terminal pattern 230 is formed on the top surface of the base substrate 100 in the protruding part 120, and is electrically connected to a first end portion of the radiation pattern 400 for electronic payment.

The fourth terminal pattern 240 is formed on the top surface of the base substrate 100 in the protruding part 120, and is electrically connected to a second end portion of the radiation pattern 400 for electronic payment.

The terminal pattern 200 may further include a fifth terminal pattern 250, a sixth terminal pattern 260, a seventh terminal pattern 270 and an eighth terminal pattern 280.

The fifth terminal pattern 250 is formed on the bottom surface of the base substrate 100 in the protruding part 120, and is electrically connected to the first terminal pattern 210. In this case, the fifth terminal pattern 250 is electrically connected to the first terminal pattern 210 through a via hole.

The sixth terminal pattern 260 is formed on the bottom surface of the base substrate 100 in the protruding part 120, and is electrically connected to the second terminal pattern 220. In this case, the sixth terminal pattern 260 is electrically connected to the second terminal pattern 220 through a via hole.

The seventh terminal pattern 270 is formed on the bottom surface of the base substrate 100 in the protruding part 120, and is electrically connected to the third terminal pattern 230. In this case, the seventh terminal pattern 270 is electrically connected to the third terminal pattern 230 through a via hole.

The eighth terminal pattern 280 is formed on the bottom surface of the base substrate 100 in the protruding part 120, and is electrically connected to the fourth terminal pattern 240. In this case, the eighth terminal pattern 280 is electrically connected to the fourth terminal pattern 240 through a via hole.

The radiation pattern 300 for wireless power transmission is formed on the base substrate 100. The radiation pattern 300 for wireless power transmission is formed on the top surface and bottom surface of the base substrate 100. The radiation pattern 300 for wireless power transmission overlaps the magnetic sheet 500.

The radiation pattern 300 for wireless power transmission is formed in the form of a loop that turns along a winding axis plural times. In this case, the winding axis is illustrated as being a virtual axis orthogonal to the top surface and bottom surface of the base substrate 100.

The first end portion of the radiation pattern 300 for wireless power transmission is electrically connected to the first terminal pattern 210. The second end portion of the radiation pattern 300 for wireless power transmission is electrically connected to the second terminal pattern 220.

Referring to FIGS. 5 and 6, the radiation pattern 300 for wireless power transmission includes a first radiation pattern 320 for wireless power transmission and a second radiation pattern 340 for wireless power transmission. In this case, the first radiation pattern 320 for wireless power transmission and the second radiation pattern 340 for wireless power transmission may be electrically connected through a plurality of via holes to form the radiation pattern 300 for wireless power transmission, which has a form in which the two radiation patterns are connected in parallel.

The first radiation pattern 320 for wireless power transmission is formed on the top surface of the base substrate 100. The first radiation pattern 320 for wireless power transmission is formed in the form of a loop that turns along the winding axis plural times.

A first end portion of the first radiation pattern 320 for wireless power transmission is electrically connected to the first terminal pattern 210. A second end portion of the first radiation pattern 320 for wireless power transmission is electrically connected to the second radiation pattern 340 for wireless power transmission through a via hole.

In this case, the first end portion is illustrated as being an end portion disposed on the outermost side of the loop formed by the first radiation pattern 320 for wireless power transmission. The second end portion is illustrated as being an end portion disposed on the innermost side of the loop formed by the first radiation pattern 320 for wireless power transmission.

The second radiation pattern 340 for wireless power transmission is formed on the bottom surface of the base substrate 100. The second radiation pattern 340 for wireless power transmission is formed in the form of a loop that turns along the winding axis plural times.

A first end portion and second end portion of the second radiation pattern 340 for wireless power transmission are electrically connected to the first radiation pattern 320 for wireless power transmission. The first end portion of the second radiation pattern 340 for wireless power transmission may be electrically connected to the first terminal pattern 210. The second end portion of the second radiation pattern 340 for wireless power transmission may be electrically connected to the second terminal pattern 220.

In this case, the first end portion is illustrated as being an end portion disposed on the outermost side of the loop formed by the second radiation pattern 340 for wireless power transmission. The second end portion is illustrated as being an end portion disposed on the innermost side of the loop formed by the second radiation pattern 340 for wireless power transmission.

The radiation pattern 400 for electronic payment is formed on the base substrate 100. The radiation pattern 400 for electronic payment is formed on the top surface of the base substrate 100. The radiation pattern 400 for electronic payment is disposed on the outside of the radiation pattern 300 for wireless power transmission on the top surface of the base substrate 100. The radiation pattern 400 for electronic payment is disposed at a location spaced apart from the first radiation pattern 320 for wireless power transmission at a given interval.

The first end portion of the radiation pattern 400 for electronic payment is electrically connected to the third terminal pattern 230. The second end portion of the radiation pattern 400 for electronic payment is electrically connected to the fourth terminal pattern 240.

The radiation pattern 400 for electronic payment is formed in the form of a loop that turns along a winding axis plural times. In this case, the winding axis is a virtual axis orthogonal to the top surface and bottom surface of the base substrate 100, and is illustrated as being another virtual axis spaced apart from the winding axis of the radiation pattern 300 for wireless power transmission.

Referring to FIGS. 5 and 6, the radiation pattern 400 for electronic payment may be formed in the form of the loop by making a detour to the bottom surface of the base substrate 100. That is, the radiation pattern 400 for electronic payment makes a detour from an area where a pattern connecting the terminal pattern 200 and the radiation pattern 300 for wireless power transmission is formed to the bottom surface of the base substrate 100. In this case, the radiation pattern 400 for electronic payment forms the loop that makes a detour to the bottom surface of the base substrate 100 through a plurality of connection patterns CP formed on the bottom surface of the base substrate 100.

The radiation pattern 400 for electronic payment partially overlaps the magnetic sheet 500. That is, a portion of the radiation pattern 400 for electronic payment is disposed on an area where the magnetic sheet 500 and the base substrate 100 do not overlap. Accordingly, a portion of the radiation pattern 400 for electronic payment does not overlap the magnetic sheet 500, and the remainder thereof overlaps the magnetic sheet 500.

The radiation pattern 400 for electronic payment may be divided into a first area that overlaps the magnetic sheet 500 and a second area that does not overlap the magnetic sheet 500.

The first area is an area that belongs to the radiation pattern 400 for electronic payment, that is adjacent to the base substrate 100, and that overlaps the magnetic sheet 500. In this case, the first area is illustrated as being ⅓ or less of height from the top of the radiation pattern 400 for electronic payment.

The second area is an area that belongs to the radiation pattern 400 for electronic payment, that is adjacent to the radiation pattern 300 for wireless power transmission, and that overlaps the magnetic sheet 500. In this case, the second area is an area except the first area of the radiation pattern 400 for electronic payment.

Referring to FIG. 7, the radiation pattern 400 for electronic payment may include an upper pattern 420, a lower pattern 440 and a side pattern 460.

The upper pattern 420 is disposed adjacent to the outer circumference of the base substrate 100. The upper pattern 420 does not overlap the magnetic sheet 500.

The lower pattern 440 is disposed adjacent to the radiation pattern 400 for electronic payment. The lower pattern 440 overlaps the magnetic sheet 500. The entire lower pattern 440 overlaps the magnetic sheet 500.

The side pattern 460 is interposed between the upper pattern 420 and the lower pattern 440. The side pattern 460 connects the upper pattern 420 and the lower pattern 440. The entire side pattern 460 may overlap the magnetic sheet 500 or a part thereof may overlap the magnetic sheet 500. In this case, some area that belongs to the side pattern 460 and that is adjacent to the lower pattern 440 may overlap the magnetic sheet 500.

Assuming that a length from the top of the upper pattern 420 to the bottom of the lower pattern 440 is a height of the radiation pattern 400 for electronic payment, the radiation pattern 400 for electronic payment has a height of approximately ⅓ or less from the top thereof, which does not overlap the magnetic sheet 500, and has up to a height of approximately ⅔ from the bottom thereof, which overlaps the magnetic sheet 500.

Accordingly, the upper pattern 420 does not overlap the magnetic sheet 500, and the lower pattern 440 overlaps the magnetic sheet 500. The entire side pattern 460 may overlap the magnetic sheet 500 or a portion of the side pattern 460 adjacent to the upper pattern 420 may not overlap the magnetic sheet 500.

The magnetic sheet 500 is disposed on the bottom surface of the base substrate 100. The magnetic sheet 500 is disposed to overlap the radiation pattern 300 for wireless power transmission and the radiation pattern 400 for electronic payment on the bottom surface of the base substrate 100. In this case, the magnetic sheet 500 is disposed to overlap the entire radiation pattern 300 for wireless power transmission and to overlap a portion of the radiation pattern 400 for electronic payment.

Referring to FIG. 8, the magnetic sheet 500 overlaps the lower pattern 440 and side pattern 460 of the radiation pattern 400 for electronic payment. Accordingly, the upper pattern 420 of the radiation pattern 400 for electronic payment does not overlap the magnetic sheet 500.

Referring to FIG. 9, the magnetic sheet 500 may overlap a portion of the side pattern 460 of the radiation pattern 400 for electronic payment. Accordingly, the upper pattern 420 and a portion of the side pattern 460, of the radiation pattern 400 for electronic payment, do not overlap the magnetic sheet 500.

The magnetic sheet 500 is formed to have a narrower area than the base substrate 100, and overlaps a portion of the base substrate 100. Accordingly, the base substrate 100 may be divided into an overlap area and a non-overlap area depending on whether the base substrate 100 overlaps the magnetic sheet 500.

The radiation pattern 300 for wireless power transmission is disposed on only the overlap area of the base substrate 100. Accordingly, the entire radiation pattern 300 for wireless power transmission overlaps the magnetic sheet 500.

The radiation pattern 400 for electronic payment is disposed on the overlap area and non-overlap area of the base substrate 100. Accordingly, a portion of the radiation pattern 400 for electronic payment overlaps the magnetic sheet 500.

In other words, the upper pattern 420 of the radiation pattern 400 for electronic payment is disposed on the non-overlap area. The lower pattern 440 and side pattern 460 of the radiation pattern for electronic payment are disposed on the overlap area. A portion of the side pattern 460 of the radiation pattern for electronic payment may be disposed on the non-overlap area of the base substrate 100.

The magnetic sheet 500 also does not overlap the terminal patterns 200. That is, an iron-based sheet is used for the area where the terminal pattern 200 is formed. Accordingly, a short circuit may occur if the magnetic sheet 500 is disposed to overlap the terminal pattern 200. Accordingly, the magnetic sheet 500 is also disposed not to overlap the terminal pattern 200.

Referring to FIGS. 10 to 13, the combo antenna module according to an embodiment of the present disclosure may further include a step compensation sheet 600 which is disposed on the bottom surface of the base substrate 100 and compensates for a step between the base substrate 100 and the magnetic sheet 500.

If the magnetic sheet 500 and the base substrate 100 are stacked, a step occurs between the magnetic sheet 500 and the base substrate 100 because the magnetic sheet 500 has a narrower area than the base substrate 100. In this case, antenna performance may be degraded because damage, such as the bending or disconnection of the radiation pattern 400 for electronic payment, occurs in a process of fabricating the combo antenna module.

Accordingly, the step compensation sheet 600 is disposed on the non-overlap area of the base substrate 100, and compensates for a step between the base substrate 100 and the magnetic sheet 500.

The step compensation sheet 600 may overlap a portion of the radiation pattern 400 for electronic payment, which does not overlap the magnetic sheet 500. That is, the step compensation sheet 600 overlaps the upper pattern 420 of the radiation pattern 400 for electronic payment. The step compensation sheet 600 may also overlap a portion of the side pattern 460 of the radiation pattern 400 for electronic payment.

Referring to FIG. 14, in general, the magnetic sheet 500 is disposed on a back surface of the base substrate 100 for shielding with a metal material 10, such as a main circuit substrate of a mobile terminal. The magnetic sheet 500 is formed to have an area and shape that fully cover the back surface of the base substrate 100. The magnetic sheet 500 overlaps the entire radiation pattern 300 for wireless power transmission and the entire radiation pattern 400 for electronic payment formed in the base substrate 100.

Accordingly, the radiation pattern 400 for electronic payment has a problem in that a recognition range and distance thereof are degraded because the range and strength of a magnetic field are degraded due to the influence of the magnetic sheet 500.

Referring to FIG. 15, in an embodiment of the present disclosure, in order to improve the range and strength of a magnetic field of the radiation pattern 400 for electronic payment, the magnetic sheet 500 overlaps a portion of the radiation pattern 400 for electronic payment so that a portion of the radiation pattern 400 for electronic payment is not shielded by the magnetic sheet 500. That is, an area of the magnetic sheet 500, which overlaps the radiation pattern 400 for electronic payment, is partially removed so that the magnetic sheet 500 is formed to have an area and shape that overlap only a portion of the radiation pattern 400 for electronic payment.

In this case, the magnetic sheet 500 overlaps a part that belongs to the radiation pattern 400 for electronic payment and that is disposed adjacent to the radiation pattern 300 for wireless power transmission, and does not overlap the remainder of the radiation pattern 400 for electronic payment disposed adjacent to the outer circumference of the base substrate 100.

Accordingly, as illustrated in FIG. 16, the range and strength of a magnetic field can be improved and a recognition range and distance of the radiation pattern 400 for electronic payment can be improved because the radiation pattern 400 for electronic payment is exposed from the area not overlapping the magnetic sheet 500 to the outside of the magnetic sheet 500.

As described above, the combo antenna module can improve the range and strength of a magnetic field and a recognition range and distance by the radiation pattern 400 for electronic payment because a portion of the radiation pattern 400 for electronic payment does not overlap the magnetic sheet 500.

As described above, although the preferred exemplary embodiment according to the present disclosure has been described, it is understood that changes may be made in various forms, and those skilled in the art may practice various changed examples and modified examples without departing from the claims of the present disclosure.

The invention claimed is:

1. A combo antenna module comprising:
   a base substrate;
   a radiation pattern for wireless power transmission formed on the base substrate;
   a radiation pattern for electronic payment formed on a top surface of the base substrate; and
   a magnetic sheet disposed on a bottom surface of the base substrate, wherein the magnetic sheet is formed to have a narrower area than the base substrate, and overlaps a portion of the base substrate,
wherein a portion of the radiation pattern for electronic payment is disposed on an area where the base substrate and the magnetic sheet do not overlap, and not overlaps with the magnetic sheet.

2. The combo antenna module of claim 1,
wherein the base substrate comprises:
an overlap area overlapping the magnetic sheet; and
a non-overlap area not overlapping the magnetic sheet.

3. Combo antenna module of claim 2,
wherein the radiation pattern for wireless power transmission is disposed on only the overlap area.

4. The combo antenna module of claim 2,
wherein the radiation pattern for electronic payment is disposed on the overlap area and the non-overlap area.

5. The combo antenna module of claim 1,
wherein a first area of the radiation pattern for electronic payment, which is adjacent to the base substrate, does not overlap the magnetic sheet.

6. The combo antenna module of claim 1,
wherein a second area of the radiation pattern for electronic payment, which is adjacent to the radiation pattern for wireless power transmission, overlaps the magnetic sheet.

7. The combo antenna module of claim 1,
wherein the radiation pattern for electronic payment is disposed between an outer circumference of the base substrate and the radiation pattern for wireless power transmission, and
wherein some area of the radiation pattern for electronic payment, which is adjacent to the outer circumference of the base substrate, does not overlap the magnetic sheet.

8. The combo antenna module of claim 7,
wherein a remaining area of the radiation pattern for electronic payment, which is adjacent to the radiation pattern for wireless power transmission, overlaps the magnetic sheet.

9. The combo antenna module of claim 4,
wherein the radiation pattern for electronic payment comprises:
an upper pattern disposed adjacent to an outer circumference of the base substrate;
a lower pattern disposed adjacent to the radiation pattern for wireless power transmission and overlapping the magnetic sheet; and
a side pattern connecting the upper pattern and the lower pattern.

10. The combo antenna module of claim 9,
wherein the side pattern overlaps the magnetic sheet.

11. The combo antenna module of claim 9,
wherein a portion of the side pattern, which is adjacent to the lower pattern, overlaps the magnetic sheet.

12. The combo antenna module of claim 9,
wherein the upper pattern does not overlap the magnetic sheet.

13. The combo antenna module of claim 1,
wherein the magnetic sheet overlaps the radiation pattern for wireless power transmission.

14. The combo antenna module of claim 1, further comprising a step compensation sheet disposed on the bottom surface of the base substrate, and disposed on an area where the magnetic sheet is not disposed.

15. The combo antenna module of claim 14,
wherein the step compensation sheet overlaps a portion of the radiation pattern for electronic payment, which does not overlap the magnetic sheet.

\* \* \* \* \*